Jan. 15, 1929.  1,699,380
J. R. STEWART
STRINGED MUSICAL INSTRUMENT
Filed Feb. 19, 1925
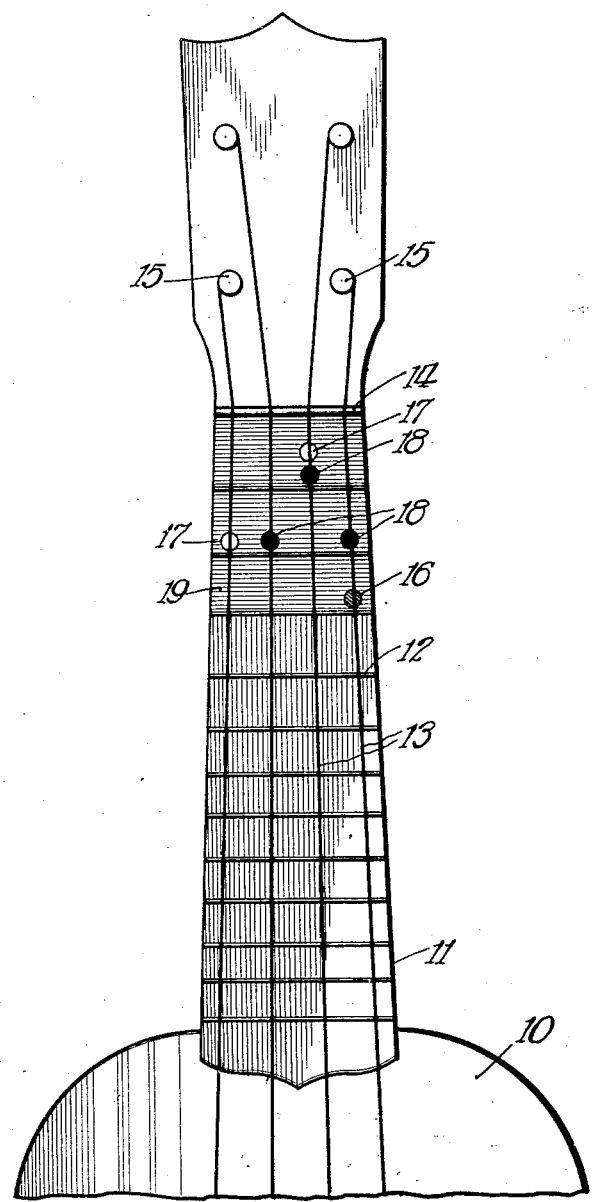
Inventor.
James R. Stewart.
By Chindahl Parker & Carlson
Attys.

Patented Jan. 15, 1929.

1,699,380

UNITED STATES PATENT OFFICE.

JAMES R. STEWART, OF CHICAGO, ILLINOIS.

STRINGED MUSICAL INSTRUMENT.

Application filed February 19, 1925. Serial No. 10,188.

The invention relates to improvements in stringed musical instruments, such as ukuleles, taropatches, banjos and the like.

The playing of stringed musical instruments is commonly taught by the use of oral or written instructions which are often confusing and difficult to apply by students beginning the study of music or lacking natural musical ability. Such students are encouraged and interested if after a short time they are able to play chords for simple selections. The primary object, therefore, of the present invention resides in the provision of means by the use of which the principal chords of a stringed musical instrument can be easily and quickly learned.

Another object is to provide an instrument of the above character with new and improved means comprising a plurality of contrasting characters which are located between the frets on the finger board and underneath the strings and which are arranged to indicate the positions on the strings where the fingers are to be placed to play the principal chords of the instrument.

A more specific object is to provide the contrasting characters in different colors, such as red, white and blue, the characters of each color indicating the fingering for one of the principal chords.

Still another object resides in the provision of a novel carrying medium for the characters, such as a chart printed on a gummed label and pasted on the finger board, or celluloid dots countersunk in the finger board.

Further objects and advantages will become apparent as the description proceeds.

The accompanying drawing is a fragmentary plan view of a ukelele embodying the features of my invention.

While the invention is susceptible of various modifications and adaptations, I have shown in the drawing and will herein describe in detail the preferred embodiment as applied to a ukelele, but it is to be understood that I do not thereby intend to limit the invention to the form disclosed but aim in the appended claims to cover all modifications and adaptations falling within the spirit and scope of the invention.

Referring to the drawing, 10 represents the body of a ukelele, and 11 designates the finger board having a plurality of frets 12. The strings 13 extend along the finger board, and over a nut 14 to a plurality of tuning pegs 15.

Secured to the finger board 11 are a plurality of contrasting characters. These characters may be of any suitable shape or design, and may be contrasted in any suitable manner. In the present instance, they are circular in shape and are made in colors of red, white and blue, represented respectively at 16, 17 and 18. The characters are so arranged that they indicate the correct fingering for the three principal chords of one key on the ukelele. Thus, the first chord is obtained by placing a finger on the red character 16, and leaving the other three strings open. The second chord is obtained by placing two fingers over the white characters 17. The third chord is obtained by placing three fingers over the blue characters 18.

It will be evident that my this means any one not skilled or apt in music can readily learn to play the three principal chords of one key of the ukelele to accompany simple musical selections without resorting to the use of confusing or difficult instructions explaining the correct fingering. The fingering is indicated at a glance, particularly where the characters are contrasted by colors.

The characters may be provided with any suitable carrying medium for applying them to the finger board. Thus they may be colored celluloid dots inset or countersunk in the finger board 12, or they may be printed upon the finger board or upon a suitable gummed label or chart 19 pasted to the finger board. This chart can be pasted over the frets 12 or can be cut to fit between the frets.

I claim as my invention:

1. A stringed musical instrument having, in combination with the finger board and a plurality of strings, a plurality of groups of contrasting characters on the finger board beneath the strings, each group indicating the fretting for one of a plurality of chords of one key on the instrument.

2. A stringed musical instrument having, in combination with the finger board and a plurality of strings, a plurality of characters of different colors on the finger board beneath the strings, the characters of each color being arranged on said finger board to indicate the fretting for one of a plurality of chords of a given key.

3. A stringed musical instrument comprising, in combination with a finger board having thereon a plurality of frets and a plurality of strings overlying the finger board and frets, a plurality of contrasting characters on the finger board between the various frets and directly underlying various strings, the different characters indicating the point or points at which the player is to apply his fingers to the strings for playing different chords.

4. A stringed musical instrument comprising, in combination with a finger board having thereon a plurality of frets and a plurality of strings overlying said frets and finger board, a plurality of indicators having different characteristics on the finger board between various frets and directly underlying various strings, the indicators of each individual characteristic designating the position at which the player is to apply his fingers to the strings to produce a definite musical chord when the strings are played.

5. A stringed musical instrument having, in combination with the finger board and the strings, a plurality of characters made in a plurality of distinct colors and positioned on the finger board beneath the strings, said characters being so arranged that the characters of one color indicate the fretting for the first chord, the characters of another color indicate the fretting for the second chord, and the characters of the third color indicate the fretting for the third chord of a given key.

6. A stringed musical instrument having, in combination with the finger board and a plurality of strings, a plurality of contrasting characters on the finger board, the characters of each kind indicating the stopping of the strings for one particular chord which differs from the chords indicated by the other kinds of characters.

7. A stringed musical instrument having, in combination with the finger board and a plurality of strings, a blank secured to the finger board beneath a plurality of the strings, a chart comprising a plurality of distinctive characters printed on said blank, the characters being arranged on said chart and the chart being positioned on said finger board in a manner such that the characters of each kind indicate the correct fretting for one chord of said instrument.

8. A blank for being secured to the finger board beneath a plurality of strings of a stringed musical instrument, said blank having a plurality of characters colored in sets of red, white and blue respectively, the characters being so arranged on said blank that the characters of each color will directly underlie certain strings at certain points along the length thereof, thereby to indicate the fretting for one chord of the instrument when the blank is correctly positioned on the finger board.

9. A blank having a plurality of contrasting characters thereon and for being secured to the finger board of a stringed instrument beneath a plurality of strings thereof, the characters being so arranged on said blank that those of each kind will indicate the fretting for one chord of the instrument when the blank is correctly positioned on the fingerboard.

In testimony whereof, I have hereunto affixed my signature.

JAMES R. STEWART.

CERTIFICATE OF CORRECTION.

Patent No. 1,699,380.             Granted January 15, 1929, to

JAMES R. STEWART.

It is hereby certified that error appears in the printed specification of the above numbered patent requiring correction as follows: Page 1, line 74, for the word "my" read "by"; page 2, lines 24, 25 and 26, claim 5, strike out the words "the strings, a plurality of characters made in a plurality of" and insert instead "a plurality of strings, a plurality of characters made in three"; and that the said Letters Patent should be read with these corrections therein that the same may conform to the record of the case in the Patent Office.

Signed and sealed this 19th day of February, A. D. 1929.

(Seal)                                        M. J. Moore,
                                             Acting Commissioner of Patents.